Patented Jan. 27, 1942

2,271,123

UNITED STATES PATENT OFFICE 2,271,123

VULCANIZATION OF RUBBER

Paul C. Jones, Akron, Ohio, assignor to The B. F. Goodrich Company, New York, N. Y., a corporation of New York No Drawing. Application June 30, 1939, Serial No. 282,062

20 Claims. (Cl. 260—786)

This invention relates to the vulcanization of rubber and to the use of combinations of accelerators to produce vulcanizates having superior properties as hereinafter explained.

It has been proposed to employ N,N'-polythioamines as accelerators and vulcanizing agents for the vulcanization of rubber. Vulcanizates prepared by this method exhibit very poor resistance to deterioration by aging and oxidation, and are accordingly unsuited to many of the present uses for vulcanized rubber.

It is the principal object of this invention, accordingly, to provide rubber compositions containing combinations of thioamines and other accelerators, which compositions may be cured in the presence or absence of added free sulfur to produce vulcanizates having good resistance to deterioration.

In accordance with the method of this invention, rubber is vulcanized in the presence of a N,N'-polythioamine and an accelerator of vulcanization containing the group

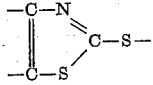

A wide variety of N,N'-polythioamines may be employed. Although the N,N'-polythio derivatives of dialkyl amines such as diethyl and di-n-butyl amine and of saturated heterocyclic compounds containing nuclear secondary amino groups such as piperidine and morpholine are preferred, N,N'-polythio derivatives of other types of primary or secondary amines such as cyclohexyl amine, diethanolamine, ethylene diamine, diethylene triamine, benzylamine, aniline, etc., may be employed if desired.

The accelerators which contain the group

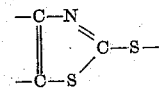

may consist not only of the aliphatic and aromatic mercaptothiazoles such as 2-mercapto-4,5-dimethylthiazole, 2-mercapto-4-ethylthiazole, 2-mercapto-benzothiazole, etc. but also derivatives which owe their accelerating power to the group depicted above such as thiazyl sulfides, polynitrophenyl esters of the mercaptothiazoles, ammonium and metallic salts of the mercaptothiazoles, etc. The term "mercapto thiazole" and its derived terms are nevertheless employed in the claims to designate only free mercapto compounds added as such to the rubber. The thiazyl polysulfides such as di-4,5-dimethylthiazyl disulfide, di-4,5-dimethylthiazyl tetrasulfide, and dibenzothiazyl disulfide are a preferred group of derivatives which may be used in conjunction with the N,N'-polythioamines in accordance with the method of this invention.

The advantages attending the use of the method of this invention will be apparent from the following examples showing the characteristics of rubber compositions vulcanized in the presence of a thioamine and a mercaptothiazyl accelerator.

*Example 1.*—The following rubber compositions were vulcanized for varying times and tested for tensile strength in an unaged state and after aging in a Bierer bomb under an oxygen pressure of 300 lbs./in.$^2$ at 70° C.

| | Compound | | |
|---|---|---|---|
| | 1 | 2 | 3 |
| Rubber | 100 | 100 | 100 |
| Zinc oxide | 5 | 5 | 5 |
| Stearic acid | 1 | 1 | 1 |
| Dithiodiethylamine | 3 | 2 | 2 |
| Mercaptoalkylthiazoles* | | 1 | |
| 2-mercaptobenzothiazole | | | 1 |

*A mixture of approximately 80 parts of 2-mercapto-4,5-dimethylthiazole and 20 parts of 2-mercapto-4-ethylthiazole.

| Minutes cure at 287° F. | Tensile strength in lbs./in.$^2$ | | |
|---|---|---|---|
| | UNAGED | | |
| 15 | No cure | 3,305 | 4,025 |
| 30 | No cure | 3,250 | 3,390 |
| 45 | 860 | 2,945 | 3,215 |
| 60 | 2,230 | 2,895 | 3,050 |
| | AGED 96 HRS. IN BIERER BOMB | | |
| 30 | | 3,065 | 3,295 |
| 60 | Sample melted | 2,510 | 2,465 |

The superiority of the compositions containing the mercaptothiazyl accelerators both as regards curing and aging characteristics is apparent.

*Example 2.*—In another experiment, trithiodiethylamine was employed.

|  | Composition | |
|---|---|---|
|  | 1 | 2 |
| Rubber | 100 | 100 |
| Zinc oxide | 5 | 5 |
| Stearic acid | 1 | 1 |
| Trithiodiethylamine | 3 | 2 |
| Mercaptoalkylthiazoles |  | 1 |

| Minutes cure at 287° F. | Tensile strength in lbs./in.$^2$ | |
|---|---|---|
| UNAGED | | |
| 15 | No cure | 3,250 |
| 30 | No cure | 3,155 |
| 45 | 1,580 | 3,400 |
| 60 | 2,270 | 2,935 |
| AGED 48 HRS. IN BIERER BOMB | | |
| 30 |  | 3,250 |
| 60 | 140 | 2,875 |

*Example 3.*—In another series of tests, rubber compositions were cured in the presence of added free sulfur.

|  | Composition | | |
|---|---|---|---|
|  | 1 | 2 | 3 |
| Rubber | 100 | 100 | 100 |
| Zinc oxide | 5 | 5 | 5 |
| Stearic acid | 1 | 1 | 1 |
| Sulfur | 3 | 3 | 3 |
| Dithiodiethylamine | 1 | .4 | .6 |
| Mercaptoalkylthiazoles |  | .2 |  |
| Di-4,5-dimethylthiazyl disulfide |  |  | .2 |

| Minutes cure at 260° F. | Tensile strength in lbs./in.$^2$ | | |
|---|---|---|---|
| UNAGED | | | |
| 30 | Under 400 | 2,950 | 2,000 |
| 45 |  | 3,610 | 3,590 |
| 60 | 1,000 | 3,960 | 4,030 |
| 90 | 2,210 | 4,260 | 4,190 |
| AGED 48 HRS. IN BIERER BOMB | | | |
| 60 | 100 | 4,020 | 3,800 |

*Example 4.*—Rubber compositions were cured in the presence of various thioamines and mercaptoalkylthiazoles comprising, as above, about 80 parts of 2-mercapto-4,5-dimethylthiazole and 20 parts of 2-mercapto-4-ethylthiazole.

| Composition | 1 | 2 | 3 | 4 | 5 | 6 | 7 | 8 | 9 | 10 |
|---|---|---|---|---|---|---|---|---|---|---|
| Rubber | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 |
| Stearic acid | 1 | 1 | 1 | 1 | 1 | 1 | 1 | 1 | 1 | 1 |
| Mercaptoalkylthiazoles | 1 | 1 | 1 | 1 | 1 | 1 | 1 | 1 | 1 | 1 |
| N,N'-dithiodiethylamine | 3 |  |  |  |  |  |  |  |  |  |
| N,N'-dithiomorpholine |  | 3 |  |  |  |  |  |  |  |  |
| N,N'-trithiomorpholine |  |  | 3 |  |  |  |  |  |  |  |
| N,N'-tetrathiomorpholine |  |  |  | 3 |  |  |  |  |  |  |
| N,N'-dithiocyclohexylamine |  |  |  |  | 3 |  |  |  |  |  |
| N,N'-trithiocyclohexylamine |  |  |  |  |  | 2 |  |  |  |  |
| N,N'-trithioethylcyclohexylamine |  |  |  |  |  |  | 2 |  |  |  |
| N,N'-dithio-n-butylamine |  |  |  |  |  |  |  | 3 |  |  |
| N,N'-trithio-n-butylamine |  |  |  |  |  |  |  |  | 3 |  |
| N,N'-dithiodiamylamine |  |  |  |  |  |  |  |  |  | 3 |

| Minutes cure at 287° F. | Tensile strength in lbs./in.$^2$ | | | | | | | | | |
|---|---|---|---|---|---|---|---|---|---|---|
| 15 | 3,640 | 1,230 | 3,880 | 3,740 | 3,170 | 2,630 | 2,610 | 3,030 | 3,860 | 1,990 |
| 30 | 3,775 | 3,260 | 3,990 | 3,850 | 2,950 | 2,660 | 2,550 | 3,440 | 3,440 | 2,730 |

When these compositions were aged, it was found that they possessed the excellent resistance to deterioration characteristic of vulcanizates cured in the presence of thioamines and thiazole accelerators. Similar results were obtained in the presence of 2-mercaptobenzothiazole and 4,5-dimethylthiazyl tetrasulfide.

*Example 5.*—In another example, synthetic rubber prepared by the copolymerization of 75 parts of butadiene-1,3 and 25 parts of acrylic nitrile was vulcanized by employing the method of this invention.

|  | Composition | |
|---|---|---|
|  | 1 | 2 |
| Synthetic rubber | 100 | 100 |
| Channel black | 50 | 50 |
| Zinc oxide | 5 | 5 |
| Antioxidant | 2 | 2 |
| Pine tar | 3.5 | 3.5 |
| Lauric acid | 1.5 | 1.5 |
| Mercaptoalkylthiazoles | 1 |  |
| 2-mercapto-4,5-dimethylthiazyl disulfide |  | 1 |
| Dithiodiethylamine | 3 | 3 |

| Minutes cure at 287° F. | Tensile strength in lbs./in.$^2$ | |
|---|---|---|
| 30 | 5,800 | 4,700 |
| 60 | 6,000 | 5,125 |
| 120 | 5,800 | 5,900 |

These compositions aged well despite the fact that they were vulcanized in the presence of a N,N'-polythioamine.

Although the invention has been described in detail in connection with specific rubber compositions, it will be evident that this invention is applicable to rubber compositions of the most varied nature, and that all manner of rubber goods including pneumatic and solid rubber tires, tubes, hose, electrical insulation, belting, packing, boots and shoes, surgical rubber goods, seamless dipped rubber articles, etc. may be vulcanized in the presence of the combinations herein described. The materials of this invention may be incorporated in the rubber by mastication, milling or any similar process, or in the case of latex, rubber cement, or any other natural or artificial dispersion or solution of rubber, by simply dissolving or suspending the materials therein.

The vulcanization may be performed in other manners than that particularly set forth in the specific examples; specifically, rubber compositions may be heated in hot air, steam, hot water, etc.

It is to be understood that the term "a rubber" is employed in the appended claims in a generic sense to designate rubbery materials capable of vulcanization when heated with sulfur and includes caoutchouc, balata, gutta percha, latex, rubber isomers, or synthetic rubber whether or not admixed with pigments, fillers, softeners, antioxidants, other accelerators, etc.

While I have herein disclosed specific embodiments of my invention, I do not intend to limit myself solely thereto, for it will be obvious to those skilled in the art that many modifications such as using other materials having equivalent properties and varying the proportions of materials used are within the spirit and scope of the invention as defined in the appended claims.

I claim:

1. The method which comprises vulcanizing a rubber in the presence of a N,N'-polythioamine and an accelerator of vulcanization containing the group

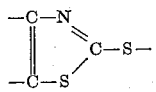

2. The method which comprises vulcanizing a rubber in the presence of a N,N'-polythiodialkylamine and an accelerator of vulcanization containing the group

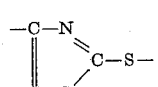

3. The method which comprises vulcanizing a rubber in the presence of a N,N'-polythiodiethylamine and an accelerator of vulcanization containing the group

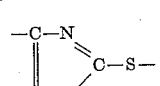

4. The method which comprises vulcanizing a rubber in the presence of a N,N'-polythiodialkylamine and 2-mercaptobenzothiazole.

5. The method which comprises vulcanizing a rubber in the presence of N,N'-dithiodiethylamine and 2-mercaptobenzothiazole.

6. The method which comprises vulcanizing a rubber in the presence of a N,N'-polythiodialkylamine and a 2-mercapto aliphatic thiazole.

7. The method which comprises vulcanizing a rubber in the presence of N,N'-polythiodiethylamine and 2-mercapto-4,5-dimethylthiazole.

8. The method which comprises vulcanizing a rubber in the presence of a N,N'-polythio derivative of a saturated heterocyclic compound containing a nuclear secondary amino group and an accelerator of vulcanization containing the group

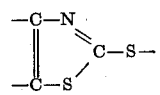

9. The method which comprises vulcanizing a rubber in the presence of a N,N'-polythiomorpholine and an accelerator of vulcanization containing the group

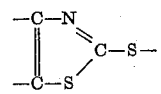

10. The method which comprises vulcanizing a rubber in the presence of a N,N'-polythiomorpholine and a 2-mercapto aliphatic thiazole.

11. The method which comprises vulcanizing a rubber in the presence of a N,N'-polythio derivative of a saturated heterocyclic compound containing a nuclear secondary amino group and a 2-mercapto aliphatic thiazole.

12. The method which comprises vulcanizing a rubber in the presence of N,N'-dithiomorpholine and 2-mercapto-4,5-dimethylthiazole.

13. A rubber composition comprising a rubber which has been vulcanized in the presence of a N,N'-polythioamine and an accelerator of vulcanization containing the group

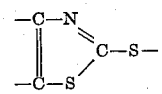

14. A rubber composition comprising a rubber which has been vulcanized in the presence of a N,N'-polythiodialkylamine and a 2-mercaptothiazyl accelerator.

15. A rubber composition comprising a rubber which has been vulcanized in the presence of a N,N'-polythiodialkylamine and 2-mercaptobenzothiazole.

16. A rubber composition comprising a rubber which has been vulcanized in the presence of N,N'-dithiodiethylamine and 2-mercaptobenzothiazole.

17. A rubber composition comprising a rubber which has been vulcanized in the presence of a N,N'-polythiodialkylamine and a 2-mercapto aliphatic thiazole.

18. A rubber composition comprising a rubber which has been vulcanized in the presence of N,N'-polythiodiethylamine and 2-mercapto-4,5-dimethylthiazole.

19. A rubber composition comprising a rubber which has been vulcanized in the presence of a N,N'-polythio derivative of a saturated heterocyclic compound containing a nuclear secondary amino group and an accelerator of vulcanization containing the group

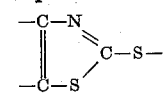

20. A rubber composition comprising a rubber which has been vulcanized in the presence of N,N'-dithiomorpholine and 2-mercapto-4,5-dimethylthiazole.

PAUL C. JONES.